United States Patent [19]

Hosoya

[11] 4,425,576

[45] Jan. 10, 1984

[54] PICTURE STABILIZING CIRCUIT IN COLOR TELEVISION RECEIVER

[75] Inventor: Nobukazu Hosoya, Nara, Japan

[73] Assignee: Sanyo Electric Co., Ltd., Osaka, Japan

[21] Appl. No.: 299,119

[22] Filed: Sep. 3, 1981

[30] Foreign Application Priority Data

Sep. 12, 1980 [JP] Japan ................................ 55-127461

[51] Int. Cl.³ ............................................ H04N 9/535
[52] U.S. Cl. .................................................. 358/21 V
[58] Field of Search ...................... 358/21 V, 21 R, 27, 358/26, 28, 29, 33, 34, 160, 166, 176

[56] References Cited

U.S. PATENT DOCUMENTS

| 4,164,750 | 8/1979 | Hosoya | 358/21 V |
| 4,189,740 | 2/1980 | Isono | 358/21 V |
| 4,305,089 | 12/1981 | Hosoya | 358/21 V |

OTHER PUBLICATIONS

A Newly Developed Correction System of Transmission Distortion with Vertical Interval Reference Signal, Itsuro Nishimura, IEEE Transaction on Consumer Electronics, vol. CE-25, Feb. 1979.

Primary Examiner—Tommy P. Chin
Attorney, Agent, or Firm—Armstrong, Nikaido, Marmelstein & Kubovcik

[57] ABSTRACT

A picture stabilizing circuit in a color television receiver decodes a count value in a counter comprising a vertical synchronizing circuit of a pulse count system for generating an ineffective-rendering pulse covering a period including a vertical synchronizing period and an equalizing pulse period. The circuit is responsive to the ineffective-rendering pulse to render ineffective or mask for the pulse period a composite synchronizing signal being applied to a picture associated circuit, such as a horizontal automatic frequency circuit, a horizontal automatic phase control circuit, a synchronization detecting circuit or the like while a burst gate-pulse-generating circuit and a direct current restoring circuit are rendered ineffective during the period of the ineffective-rendering pulse. The circuit comprises a flip-flop for generating an ineffective-rendering pulse which is set responsive to one decoder coupled to the counter and is reset responsive to the other decoder coupled to the counter. The output of the flip-flop is utilized as an ineffective-rendering pulse.

11 Claims, 4 Drawing Figures

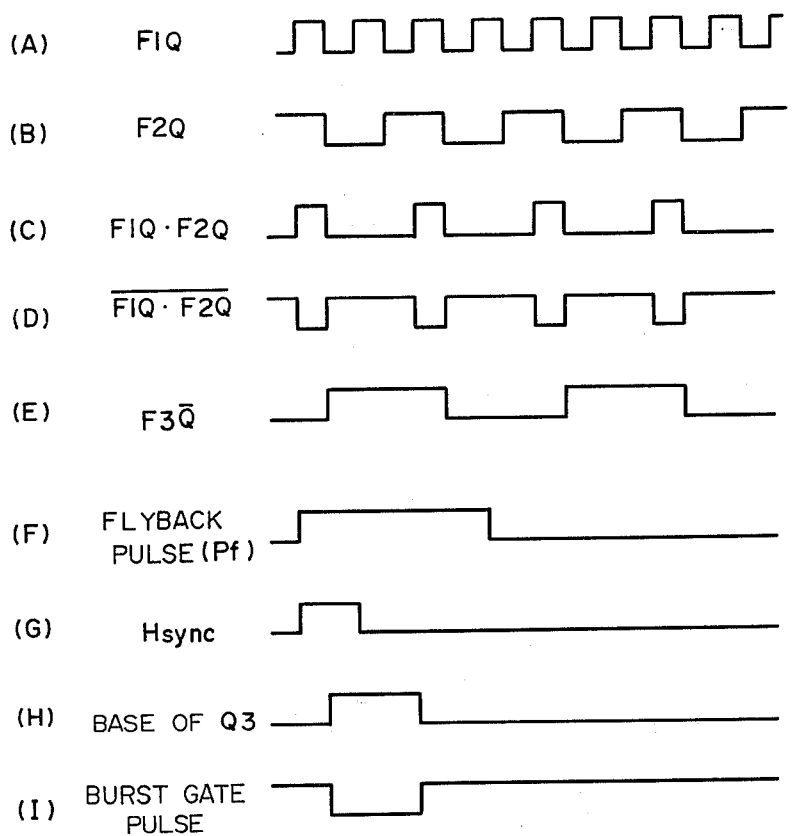

PICTURE STABILIZING CIRCUIT IN COLOR TELEVISION RECEIVER

BACKGROUND OF THE INVENTION

1. Field of the Invention

The present invention generally relates to a picture stabilizing circuit in a color television receiver. More specifically, the present invention relates to a picture stabilizing circuit acting upon a composite synchronizing signal being applied to a picture associated circuit for obtaining a stabilized color television picture.

2. Description of the Prior Art

A color television receiver includes several circuits associated with the stability and quality of picture of color television and such circuits are generally referred to as "a picture associated circuit" in the present application. A color television receiver is provided with a horizontal automatic frequency control circuit and/or automatic phase control circuit for the purpose of synchronization of a receiver with a transmitter for providing a stabilized picture. A burst gate circuit is also provided for extracting a color burst signal included in a color television signal. A color subcarrier is generated using as a reference signal a color burst extracted by the burst gate circuit. A direct current restoring circuit is also provided for restoring a direct current component of a composite video signal obtained from a video detector circuit. A synchronization detecting circuit is also provided for the purpose of detecting whether or not a color television receiver is in synchronized state responsive to a composite synchronizing signal and a horizontal flyback pulse. If and when not only a horizontal synchronizing signal but also a vertical synchronizing signal and an equalizing pulse are supplied as a reference input to a horizontal automatic frequency control circuit and/or automatic phase control circuit, a picture distortion occurs at the start end of the vertical scanning of the screen. The output of the burst gate circuit provides only a noise component during a period in the absence of the color burst such as during a period of an equalizing pulse and a horizontal synchronizing signal. When such an output of a burst gate circuit is applied to a color processing circuit, degradation of the signal to noise ratio of a reproduced color signal is caused. A direct current restoring circuit often employs a burst gate pulse as a direct current restoring gate pulse. In the case of such a direct current restoring circuit, the restored direct current level is fixed to the level of the peak of such synchronizing signal during a period of a vertical synchronizing signal and a period of an equalizing pulse and therefore a brightness variation is caused in the vicinity of a vertical synchronization period, which accordingly degrades the quality of picture. Furthermore, a synchronization detecting circuit generally utilizes a logic circuit for receiving a composite synchronizing signal and a horizontal flyback pulse. Such a logic circuit comprises an exclusive OR circuit receiving a composite synchronizing signal and a horizontal flyback pulse or an AND gate receiving a composite synchronizing signal and a horizontal flyback pulse. In the case of such synchronization detecting circuit, application of a vertical synchronizing signal and an equalizing pulse as inputs leads to a decrease in sensitivity for synchronizing detection. Thus, application of an equalizing pulse and a vertical synchronizing signal to a picture associated circuit in a conventional color television receiver leads to a decrease in stability of a picture or the quality of a picture as a whole.

In order to eliminate the above described problems, the following approach may be considered. More specifically, one approach is to render ineffective or to mask the composite synchronizing signal being applied to the picture associated circuit during an equalizing pulse period and a vertical synchronizing signal period. In order to make such a rendering ineffective rendering operation, it is necessary to generate an ineffective rendering pulse. In order to generate such an ineffective rendering pulse, one might simply think of employment of a one-shot multivibrator so that a pulse may be generated using a vertical synchronizing signal from one field before as a reference so as to cover a vertical synchronizing signal period and an equalizing pulse period of the subsequent field. However, it is much difficult to delay an ineffective rendering pulse generated by such one-shot multivibrator by one field with accuracy irrespective of a temperature change. Accordingly, the above described obvious approach is lacking in temperature stability and is not practicable.

SUMMARY OF THE INVENTION

Briefly described, the present invention is adapted to generate an ineffective rendering pulse responsive to a count value in a counter comprising a vertical synchronizing circuit of a pulse count system so as to cover at least a vertical synchronizing period, preferably a vertical synchronizing period and an equalizing pulse period. A picture associated circuit is rendered ineffective during the period of the ineffective rendering pulse as a function of the ineffective rendering pulse.

According to the present invention, use is made of a counter included in a vertical synchronizing circuit to generate an ineffective rendering pulse upon attainment of a particular count value and therefore an ineffective rendering pulse having a desired pulse period can be generated with accuracy and with temperature stability as compared with the above described obvious approach where a one-shot multivibrator was employed. Use is made of such an ineffective rendering pulse as generated with stability and accuracy to render ineffective a picture associated circuit and therefore a picture of a good stability and quality can be obtained even in the case of a weak electric field intensity, in particular.

In one embodiment of the present invention, a horizontal automatic frequency control circuit and/or horizontal automatic phase control circuit is rendered ineffective with such an ineffective rendering pulse as described above during the period of the ineffective rendering pulse. As a result, a picture distortion at the start end of the horizontal scanning on the screen can be eliminated.

In a preferred embodiment of the present invention, a burst gate pulse generating circuit is rendered ineffective during the period of the ineffective rendering pulse. As a result, a signal to noise ratio can be prevented from being degraded due to application of an output of a burst gate circuit to a color processing circuit during a period in the absence of a color burst signal.

In another preferred embodiment of the present invention, a clamp pulse generating circuit for restoring of a direct current component is rendered ineffective during the period of the ineffective rendering pulse. As a result, a brightness variation can be eliminated and a color can be reproduced with accurate hue and saturation.

In a further preferred embodiment of the present invention, a composite synchronizing signal being applied to a synchronization detecting circuit as a reference input is rendered ineffective during the period of the ineffective rendering pulse. As a result, a decrease of synchronization detecting sensitivity can be prevented.

Accordingly a principal object of the present invention is to provide a picture stabilizing circuit in a color television receiver wherein a picture of a good quality and stability can be obtained even in the case of a weak electric field intensity.

One aspect of the present invention resides in a color television receiver, wherein use is made of a counter included in a vertical synchronizing circuit of a pulse count system to generate an ineffective rendering pulse covering a vertical synchronizing period, preferably a vertical synchronizing period and an equalizing pulse period, so that a composite synchronizing signal being applied to a picture associated circuit is rendered ineffective with such ineffective rendering pulse.

Another aspect of the present invention resides in an ineffective rendering pulse generating circuit of a good temperature stability.

A further aspect of the present invention resides in a color television receiver including a decoder coupled to a counter included in a vertical synchronizing circuit and a two-state circuit being set and reset responsive to the decoder, the output from the two-state circuit being utilized as an ineffective rendering pulse.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart for explaining an operation for generating a burst gate pulse by the circuit shown in the FIG. 3 diagram.

DESCRIPTION OF THE PREFERRED EMBODIMENTS

Figure 1:
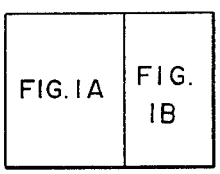
FIG. 1 (comprised of 1A and 1B) is a schematic diagram showing one embodiment of the present invention, and particularly showing one example of a vertical synchronizing circuit and an ineffective rendering pulse generating circuit and so on associated therewith.
Figure 1A:
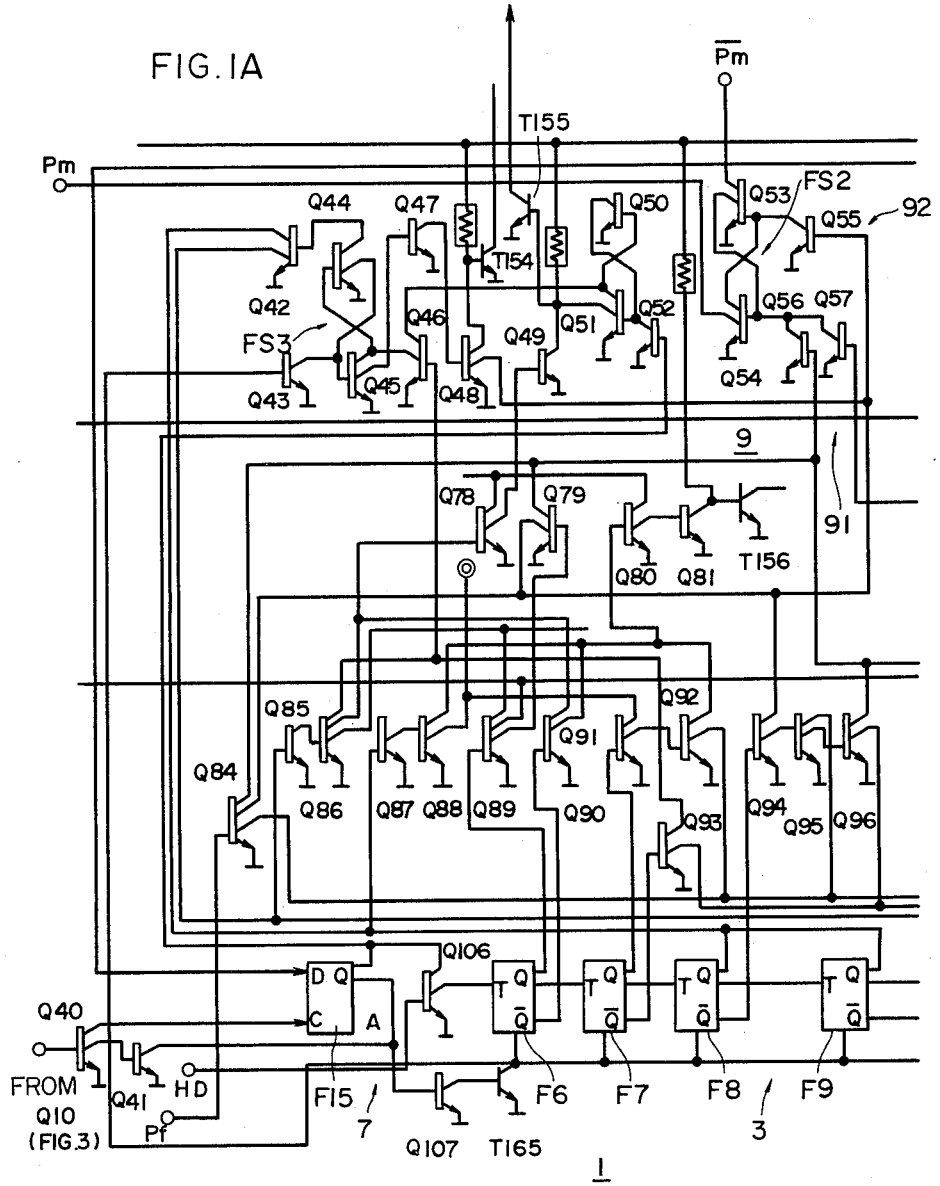
Figure 1B:
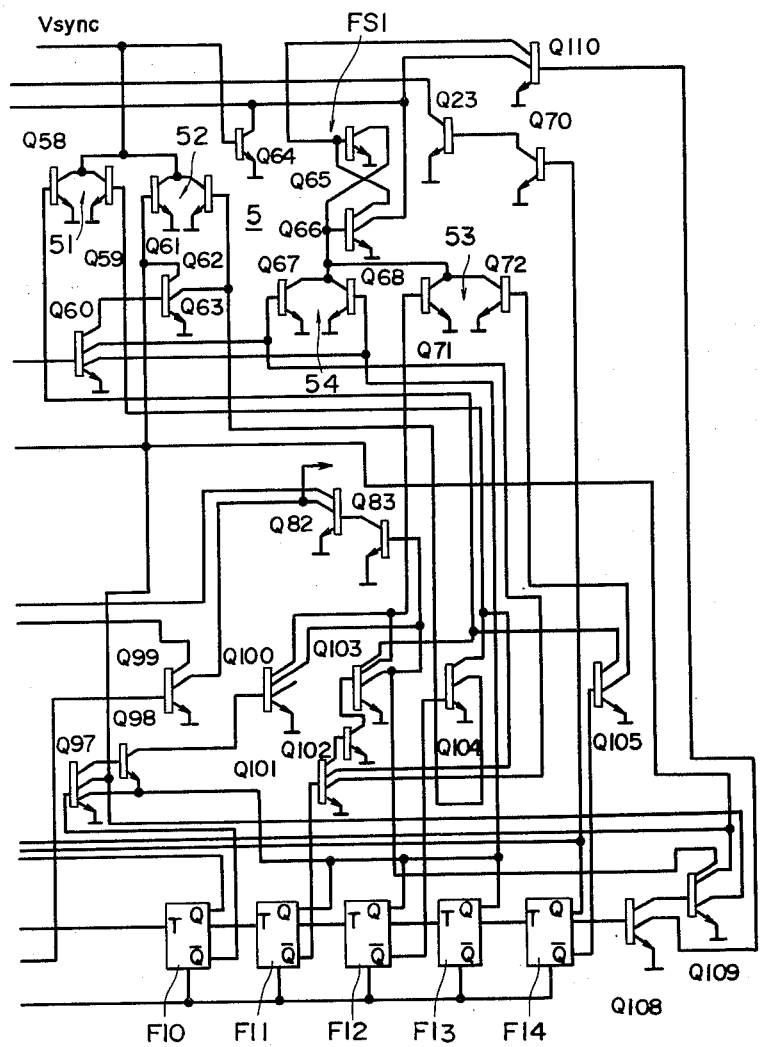

FIG. 1 is a schematic diagram showing one emobodiment of the present invention. In particular, FIG. 1 specifically shows a vertical synchronizing circuit of a pulse count system and an ineffective rendering pulse generating circuit associated therewith. Referring to FIG. 1, transistors denoted with reference characters of Q followed by a subscript are transistors formed by an I²L (I square L) process, while transistors denoted with reference characters of T followed by a subscript are transistors formed by an ordinary bipolar process each of which operates as an inverter; and the same applies to FIG. 3 to be described subsequently.

The FIG. 1 vertical synchronizing circuit 1 comprises a down counter 3, a pull-in frequency range setting circuit 5 and a reset circuit 7. The down counter 3 comprises nine T-flip-flops F6 to F14 connected in a cascade fashion. The down counter 3 is connected to receive as a count input the output from a horizontal synchronizing circuit (to be described subsequently), i.e. a horizontal synchronizing signal Hsync being applied through an inverter transistor Q106. Such a vertical synchronizing circuit 1 of a pulse count system utilizing a down counter 3 is described in, for example, an article entitled "A HIGHLY STABLE INTEGRATED SYNC SYSTEM" authored by Milton Wilcox appearing in IEEE Transactions on Consumer Electronics, Vol. CE-24, No. 3 issued August 1978 and thus is well-known to those skilled in the television art. However, a description of the circuits of FIG. 1 is provided below.

A frequency range setting circuit 5 is aimed to set a pull-in range of a vertical oscillation frequency and the embodiment shown is adapted such that the above described pull-in range is switchable between the NTSC system and the PAL system and is also adapted such that the same is changed on the occasion of reception of a broadcasting electric wave and on the occasion of reception of a signal from a video reproducing apparatus such as a video tape recorder. In the embodiment shown the pull-in range of the vertical oscillation frequency is given in Table I.

TABLE I

| System | On the Occasion of Reception of Broadcasting | On the Occasion of Reception from VTR |
|---|---|---|
| NTSC | 57.846–61.461 Hz | 54.632–65.558 Hz |
| PAL | 48.828–51.398 Hz | 44.389–54.253 Hz |

Such pull-in range is set by a setting circuit 5. the pull-in frequency range setting circuit 5 comprises a decoder 51 for setting a lower limit frequency of a pull-in range on the occasion of reception of the signal from a video tape recorder. The decoder 51 comprises transistors Q101, Q102, Q103, Q105 and Q58 for the NTSC system, i.e. for the frequency of 54.632 Hz. The transistor Q101 is connected to receive as a base input the output $\overline{Q}$ of a flip-flop F11 and the transistors Q102 and Q103 are connected in succession in a cascade fashion to the transistor Q101. The transistor Q105 is connected to receive as a base input the output $\overline{Q}$ of a flip-flop F14 and the collector of the transistor Q105 is connected to the collector of the transistor Q103, whereby a logical product of these two outputs is evaluated and the logical product output is applied to the base of a transistor Q58.

The pull-in range setting circuit comprises a decoder 52 for setting a lower limit frequency of a pull-in range on the occasion of reception of color television broadcasting. The decoder 52 comprises transistors Q97, Q108, Q109 and Q61 for the NTSC system, i.e. for the frequency of 57.846 Hz. The transistor Q97 is connected to receive as a base input the output Q of a flip-flop F10. The transistor Q108 is connected to receive as a base input the output $\overline{Q}$ of a flip-flop F14 and the transistor 109 is connected in a cascade fashion to the transistor Q108. The collector of the transistor Q109 is connected to the collector of the transistor Q97, whereby these two outputs are ANDed, and the ANDed output is applied as a base input to the transistor Q61.

The pull-in range frequency range setting circuit 5 further comprises a decoder 53 for setting an upper limit frequency of the pull-in range on the occasion of reception of color television broadcasting. The decoder 53 comprises transistors Q105 and Q72 for the NTSC system, i.e. for the frequency of 61.461 Hz. The transistor Q105 is connected to receive as a base input the output $\bar{Q}$ of a flipflop F14. The collector output of the transistor Q105 is applied as a base input to the transistor Q72.

The pull-in frequency range setting circuit 5 further comprises a decoder 54 for setting an upper limit frequency of the pull-in range on the occasion of reception of the signal from a video tape recorder. The decoder 54 comprises trnasistors Q97 and Q68 for the NTSC system, i.e. for the frequency of 65.588 Hz. The transistor Q97 is connected to receive as a base input the output $\bar{Q}$ of a flip-flop F10. The base of the transistor Q68 is connected to receive the collector output of the transistor Q97 and the ANDed output of the respective outputs Q of the flip-flops F11, F12 and F13.

As described in the foregoing, the pull-in frequency range setting circuit 5 is adapted to set the vertical oscillation frequency to be in the above described pull-in range based on a count value of the counter 3. The count value of the down counter 3 corresponding to Table I is shown in Tables II and III. Table II shows a case of the NTSC system and Table III shows a case of the PAL system.

TABLE II

| (NTSC System) | |
|---|---|
| Frequency (Hz) | Count Value |
| 54.632 | 288 (= $2^8 + 2^5$) |
| 57.846 | 272 (= $2^8 + 2^4$) |
| 59.939 | 262.5 |
| (Center Frequency) | |
| 61.461 | 256 (= $2^8$) |
| 65.558 | 240 (= $2^7 + 2^6 + 2^5 + 2^4$) |

TABLE III

| (PAL System) | |
|---|---|
| Frequency (Hz) | Count Value |
| 44.389 | 352 (= $2^8 + 2^6 + 2^5$) |
| 48.828 | 320 (= $2^8 + 2^6$) |
| 50.000 | 312.5 |
| (Center Frequency) | |
| 51.398 | 304 (= $2^8 + 2^5 + 2^4$) |
| 54.253 | 288 (= $2^8 + 2^5$) |

As to be subsequently described in detail, the down counter 3 is reset in synchronism with the vertical synchronizing signal when the vertical synchronizing signal is obtained if the count value is within the pull-in frequency range or when the count value corresponding to the lower limit frequency of the pull-in range is counted when the vertical synchronizing signal is not obtained, by means of the above described pull-in frequency range setting circuit 5 and the resetting circuit 7. The minimum count values corresponding to the above described lower limit frequency are shown in Tables II and III.

As seen from Tables II and III, on the occasion of reception of the signal from a video tape recorder of the NTSC system, the pull-in frequency range is the range of 288 to 240 in terms of the count value. On the occasion of reception of color television broadcasting of the NTSC system, the pull-in frequency range is the range of 272 to 256 in terms of the count value. In the case of the PAL system, the pull-in frequency range is the range of 352 to 288 (on the occasion of a video tape recorder) and is the range of 320 to 304 (on the occasion of broadcasting electric wave) in terms of the count value. A relation between these count values and thus the frequencies and the respective outputs Q of the flip-flops F6 to F14 is shown in Table IV.

TABLE IV

| Frequency (Count Value) | F14 ($2^8$) | F13 ($2^7$) | F12 ($2^6$) | F11 ($2^5$) | F10 ($2^4$) | F9 ($2^3$) | F8 ($2^2$) | F7 ($2^1$) | F6 ($2^0$) |
|---|---|---|---|---|---|---|---|---|---|
| 54.632 Hz (288) | 1 | 0 | 0 | 1 | 0 | 0 | 0 | 0 | 0 |
| 57.846 Hz (272) | 1 | 0 | 0 | 0 | 1 | 0 | 0 | 0 | 0 |
| 61.461 Hz (256) | 1 | 0 | 0 | 0 | 0 | 0 | 0 | 0 | 0 |
| 65.558 Hz (240) | 0 | 1 | 1 | 1 | 1 | 0 | 0 | 0 | 0 |
| 44.389 Hz (352) | 1 | 0 | 1 | 1 | 0 | 0 | 0 | 0 | 0 |
| 48.828 Hz (320) | 1 | 0 | 1 | 0 | 0 | 0 | 0 | 0 | 0 |
| 51.398 Hz (304) | 1 | 0 | 0 | 1 | 1 | 0 | 0 | 0 | 0 |
| 54.253 Hz (288) | 1 | 0 | 0 | 1 | 0 | 0 | 0 | 0 | 0 |

As seen from Table IV, the decoder 51 receives the output of the flip-flop F14 and the output of the flip-flop F11 in the case of the NTSC system. Likewise, the decoder 52 receives the output of the flip-flop F14 and the output of the flip-flop F10 in the case of the NTSC system. The decoder 53 receives the output of the flip-flop F14 in the case of the NTSC system. The decoder 54 receives the outputs of the flip-flops F13, F12, F11 and F10 in the case of the NTSC system.

The decoder 51 for defining the lower limit of the pull-in frequency range on the occasion of reception of the signal from a video reproducing apparatus such as a video tape recorder comprises transistors Q101, Q104, Q108, Q110 and Q59 for the PAL system, i.e. for the frequency of 44.389 Hz. The transistor Q101 receives the output $\bar{Q}$ of the flip-flop F11 and the transistor Q104 receives the output $\bar{Q}$ of the flip-flop F12. The collector output of the transistor 101 and the collector output of the transistor Q104 are ANDed and the ANDed output is applied to the base of the transistor Q59. On the other hand, the output Q of the flip-flop F14 is applied to the base of the transistor Q108 and the collector output of the transistor Q108 is applied to the base of the transistor Q110. In order to decrease the number of gates employed, the embodiment is structured such that the down counter 3 is first reset at the timing when the flip-flops F6 to F14 constituting the down counter 3 counts 256, then the down counter 3 is reset at the timing when the flip-flops F6 and F14 count 96 (=352−$2^8$). More specifically, the output Q of the flip-flop F14 becomes the high level when the flip-flops F6 to F14 count 256. The output Q of the flip-flop F14 is supplied to the input D of the D-flip-flop F15 through the transistors Q108 and Q110. Accordingly, the output Q of the flip-flop F15 is obtained as the high level and the output is supplied to the base of the transistor Q107. Therefore, the collector of the transistor Q107 becomes the low level at that time and accordingly the transistor T165 is turned off. Upon turning off of the transistor T165, the flip-flops F6 to F14 are reset and a count operation of the down counter 3 is started again from zero. Then an ANDed output of the outputs of transistors Q101 and Q104 is supplied to the base of the transistor Q59 when the down counter 3 counts 96, i.e. the outputs Q of the flip-flop F11 and F12 become the high level. Thus, the decoder 51 provides the output responsive to the outputs of the flip-flops F14, F12 and F11 in the case of the PAL system. The transistors Q58 and Q59 included in the decoder 51 function as a selecting switch for selecting either the NTSC system or the PAL system, as is clear from the foregoing description.

The decoder 52 for defining the lower limit of the pull-in frequency range on the occasion of reception of the broadcasting electric wave comprises transistors Q104, Q108, Q110 and Q62 for the PAL system, i.e. for the frequency of 48.828 Hz. The transistors Q108 and Q110 function in the same manner as the above described decoder 51. The transistor Q104 receives the output $\bar{Q}$ of the flip-flop F12 at the base thereof and the output from the transistor Q104 is applied to the base of the transistor Q62. The transistors Q61 and Q62 included in the decoder 52 function as a selecting switch for selecting either the NTSC system or the PAL system, as is clear from the foregoing description.

The decoder 53 for defining the upper limit of the pull-in frequency range on the occasion of reception of the broadcasting electric wave comprises transistors Q97, Q98, Q100, Q101, Q102, Q103, Q108, Q110 and Q71 for the PAL system, i.e. for the frequency of 51.398 Hz. The transistors Q108 and Q110 function in the same manner as described in conjunction with the decoder 51. The transistor Q97 receives at the base thereof the output $\bar{Q}$ of the flip-flop F10 and the output from the transistor Q97 is applied to the transistors Q98 and Q100 connected in a cascade fashion. The transistor Q101 receives at the base thereof the output Q of the flip-flop F11 and the output of the transistor Q101 is applied to the transistors Q102 and Q103 connected in a cascade fashion. The collector of the transistor Q100 and the collector of the transistor Q103 are both connected to the base of the transistor Q71. The transistors Q71 and Q72 included in the decoder 53 function as a selecting switch for selecting either the NTSC system or the PAL system, as is clear from the foregoing description.

The decoder 54 for defining the upper limit of the pull-in frequency range on the occasion of reception of the signal from a video reproducing apparatus such as a video tape recorder comprises transistors Q101, Q108, Q110 and Q67 for the PAL system, i.e. for the frequency of 54.253 Hz. The function of the transistors Q108 and Q110 is the same as described in conjunction with the decoder 51. The transistor Q101 receives the output $\bar{Q}$ of the flip-flop F11 and the output of the transistor Q101 is applied to the base of the transistor Q67. The transistors Q67 and Q68 included in the decoder 54 function as a selecting switch for selecting either the NTSC system or the PAL system, as is clear from the foregoing description.

The reset circuit 7 included in the vertical synchronizing circuit 1 comprises a flip-flop FS1, a D-flip-flop F15 and transistors Q107 and T146. The flip-flop FS1 comprises transistors Q65 and Q66 connected crosswise and the output of the flip-flop FS1 is obtained from the collector of the transistor Q66. The flip-flop FS1 comprises an R-S flip-flop, the set input of which is connected to receive the outputs of the decoders 53 and 54. More specifically, the base of the transistor Q66 is connected to the collectors of the transistors Q67, Q68 and Q71, Q72. The output of the flip-flop FS1 and the collector output of the transistor Q64 are together applied to the data input D of the flip-flop F15. The transistor Q64 is connected to receive at the base thereof the vertical synchronizing signal Vsync separated from a composite video signal which is provided and the output of the decoder 51 and the output of the decoder 52. More specifically, the base of the transistor Q64 is connected to the collectors of the transistors Q58, Q59 and Q61, Q62. The clock input C of the above described flip-flop F15 is supplied with an inversion of the output Q of the flip-flop F4 constituting a down counter 17 of the horizontal synchronizing circuit (FIG. 3) to be described subsequently. The inversion of the output Q of the flip-flop F4 (FIG. 3) is applied to the transistor Q41 and the output of the transistor Q41 and the output of the flip-flop F15 are ANDed and the ANDed output is applied to the base of the transistor Q107. The output of the transistor Q107 is connected to the base of the transistor T165 and the collector output of the transistor T165 is obtained as a reset pulse. The reset pulse is applied to the respective reset inputs of the flip-flops F6 to F14 constituting the down counter 3. Meanwhile, the reset pulse obtained from the transistor T165 is applied through a buffer transistor or an inverter transistor (not shown), as necessary, to the vertical drive circuit (not shown) as a vertical driving pulse VD (not shown).

The down counter 3 constituting the vertical synchronizing circuit 1 thus receives the horizontal synchronizing signal at the count input thereof, so that the same is reset responsive to the reset pulse from the reset circuit 7, whereby a count operation is started again from zero. In the case where the vertical synchronizing signal Vsync exists in the pull-in frequency range, i.e. in the range of the count value shown in Table II or Table III, the reset pulse is obtained as a function of the output from the transistor Q64. On the other hand, in the case where the vertical synchronizing signal does not exist in the pull-in frequency range, the reset pulse is obtained as a function of the output of the decoder 51 or the output of the decoder 52. More specifically, the counter 3 is reset upon receipt of the vertical synchronizing signal or when the counter counts a count value corresponding to the lower limit of the pull-in frequency range set by the decoder 51 or 52.

Now the ineffective rendering pulse generating circuit 9 constituting the feature of the present invention will be described in detail. The ineffective rendering pulse generating circuit 9 comprises an R-S flip-flop FS2 and decoders 91 and 92. The decoder 91 is for setting the flip-flop FS2 and the decoder 92 is for resetting the flip-flop FS2.

The R-S flip-flop FS2 comprises a pair of transistors Q53 and Q54 connected crosswise. The set input of the flip-flop FS2 is connected to receive the collector outputs of the transistors Q56 and Q57 and the reset input of the flip-flop FS2 is connected to receive the output of the transistor Q55. The decoder 91 comprises transistors Q108, Q109, Q94, Q95, Q91, Q92, Q84 and Q57 for the NTSC system. The transistor Q108 is connected to receive at the base thereof the output Q of the flip-flop F14 included in the down counter 3 and the output of the transistor Q108 is applied to the transistor Q109. The transistor Q94 is connected to receive at the base thereof the output $\bar{Q}$ of the flip-flop F8 and the output of the transistor Q94 is applied to the transistor Q95. The transistor Q91 is connected to receive at the base thereof the output $\overline{Q}$ of the flip-flop F7 and the output of the transistor Q91 is applied to the transistor Q92. The transistor Q84 is connected to receive the horizontal flyback pulse Pf obtained from a horizontal output circuit (not shown) with the positive polarity so that the transistor Q84 is turned on during the horizontal blanking period and is turned off during the other period. The collector outputs of the transistors Q84, Q92, Q95 and Q109 are together connected to the base of the transistor Q57. Accordingly, the base of the transistor Q57 is supplied with the ANDed output of the respective outputs, i.e. the output Q of the flip-flop F7, the output Q of the flip-flop F8 and the output Q of the flip-flop F14 and the inverted output of the horizontal flyback pulse.

The decoder 91 comprises the transistors Q108, Q109, Q83, Q82, Q101, Q102, Q103, Q94, Q95, Q96, Q89, Q79, Q84 and Q56 for the PAL system. The transistor Q108 receives the output Q of the flip-flop F14 and the output of the transistor Q108 is applied to the transistors Q109, Q83 and Q82 connected in a cascade fashion. The transistor Q101 receives at the base thereof the output Q of the flip-flop F11 and the output of the transistor Q101 is applied to the transistors Q102 and Q103 connected in a cascade fashion. The transistor Q94 receives at the base thereof the output $\overline{Q}$ of the flip-flop F8 and the output of the transistor Q94 is applied to the transistors Q95 and Q96 connected in a cascade fashion. The transistor Q89 receives at the base thereof the output Q of the flip-flop F6 and the output of the transistor Q89 is applied to the transistor Q79. The transistor Q84 receives the horizontal blanking pulse, as described in the foregoing. The collectors of the transistors Q84, Q79, Q96 and Q82 are together connected to the base of the transistor Q56. Accordingly, the transistor Q56 is supplied with the ANDed output of the outputs Q of the flip-flops F6, F8, F11 and F14 and the inverted output of the horizontal flyback pulse. Thus, the decoder 91 for setting the flip-flop FS2 receives the output of different flip-flops for each of the NTSC system and the PAL system.

The decoder 92 for resetting the flip-flop FS2 is commonly used both for the NTSC system and the PAL system. More specifically, the decoder 92 comprises the transistors Q94, Q89, Q79, Q84 and Q48. The transistor Q94 receives at the base thereof the output $\overline{Q}$ of the flip-flop F8 constituting the down counter 3. The transistor Q89 receives at the base thereof the output Q of the flip-flop F6 and the output of the transistor Q89 is applied to the transistor Q79. The transistor Q84 receives the horizontal flyback pulse Pf, as described previously. The base of the transistor Q48 is supplied with the output of the transistor Q47. The input of the transistor Q47 is supplied with the output of the R-S flip-flop FS3 and thus the output of the transistor Q45. The flip-flop FS3 is set responsive to the reset pulse obtained through the transistor Q43 from the above described reset circuit 7 and is reset responsive to the twenty-second line selector pulse, not shown. The outputs of the transistors Q48, Q84, Q79 and Q94 are together connected to the base of the transistor Q55. Accordingly, the base of the transistor Q55 is supplied with the ANDed output of the respective outputs Q of the flip-flops F6 and F8 and the inverted output of the horizontal flyback pulse and the output of the transistor of Q48. The output of the transistor Q55 is applied to the reset input of the flip-flop FS2 and thus to the base of the transistor Q53.

The R-S flip-flop FS2 implemented by the transistors Q53 and Q54 is set responsive to the output of the transistor Q57 and is reset responsive to the output of the transistor Q55 on the occasion of the NTSC system. On the other hand, the flip-flop FS2 is set responsive to the output of the transistor Q56 and is reset responsive to the output of the transistor Q55 on the occasion of the PAL system. The outputs of the flip-flop FS2, i.e. the pulse obtained from the transistors Q54 and Q53 are applied to various video associated circuits to be described subsequently as ineffective rendering pulses Pm and $\overline{Pm}$.

Figure 2:
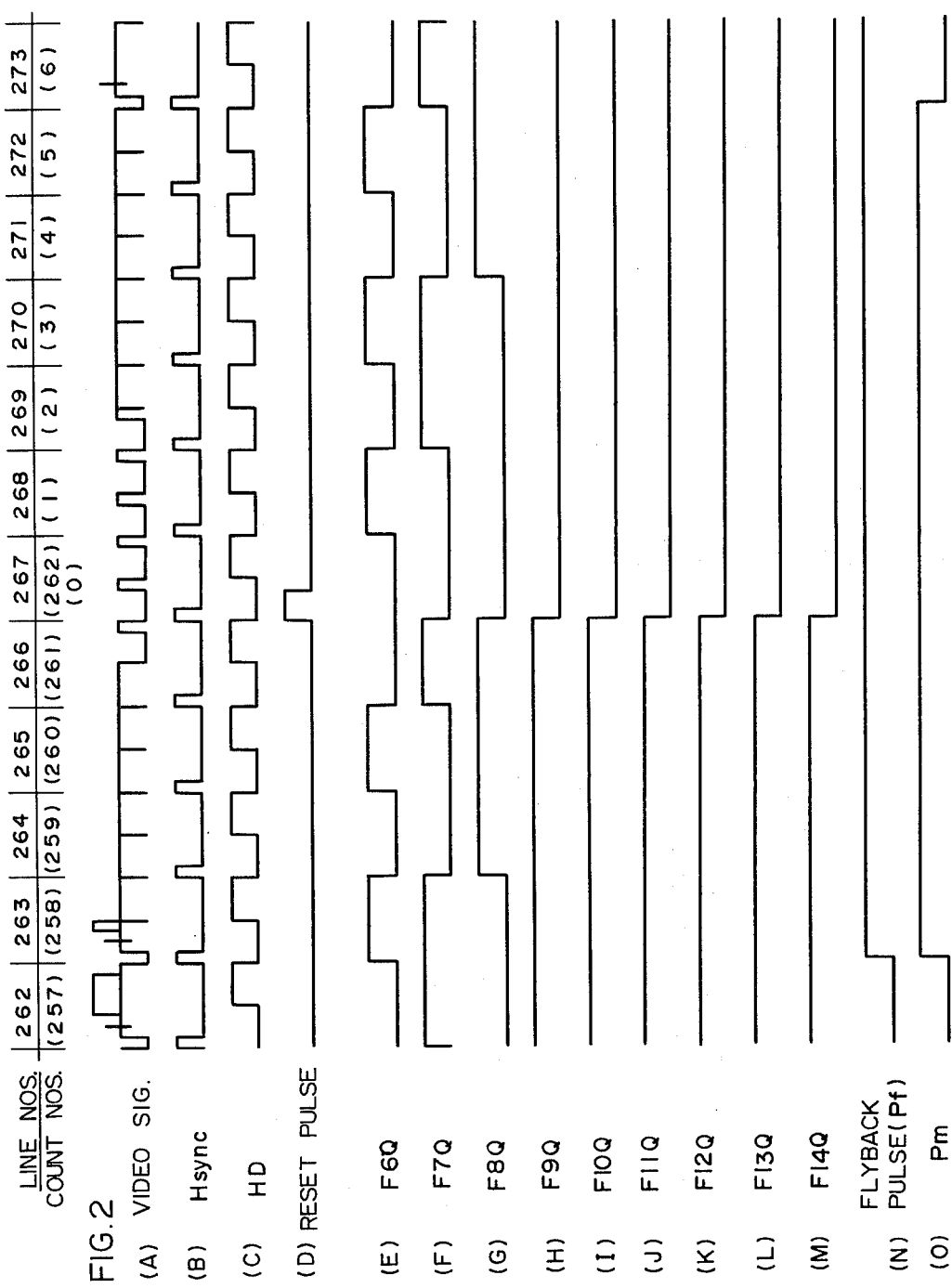
FIG. 2 is a timing chart for explaining an operation of the FIG. 1 diagram.

FIG. 2 is a timing chart for explaining the operation of the FIG. 1 embodiment and particularly the operation of the ineffective rendering pulse generating circuit 9. Referring to FIG. 2, the operation of the above described ineffective rendering pulse generating circuit 9 on the occasion of the NTSC system will be described.

In the case of the NTSC system, the flip-flop FS2 is set responsive to the output of the transistor Q57. The input of the transistor Q57 is supplied with the ANDed output of the respective outputs, i.e. the output Q of the flip-flop F7, the output $\overline{Q}$ of the flip-flop F8 and the output Q of the flip-flop F14, and the inverted output of the horizontal flyback pulse Pf, as described previously. The output Q of the flip-flop F7 is shown as (F) in FIG. 2, the output $\overline{Q}$ of the flip-flop F8 is shown as (G) in FIG. 2, and the output Q of the flip-flop F14 is shown as (M) in FIG. 2. The horizontal blanking pulse or the flyback pulse Pf is shown as (N) in FIG. 2. Accordingly, the transistor Q57 provides the high level output, when the output Q of the flip-flop F14 is the high level, the output $\overline{Q}$ of the flip-flop F8 is the high level, the output Q of the flip-flop F7 is the high level, and the flyback pulse Pf is the high level, i.e. the output of the transistor Q84 is the low level. Accordingly, the output of the transistor Q53 of the flip-flop FS2, i.e. the ineffective rendering pulse Pm becomes the high level at the timing shown as (O) in FIG. 2. Thus, the ineffective rendering pulses Pm and $\overline{Pm}$ are obtained from the flip-flop FS2.

The flip-flop FS2 is reset responsive to the output of the transistor Q55. The input of the transistor Q55 is supplied with the ANDed output of the outputs Q of the flip-flops F6 and F8, and the inverted output of the horizontal flyback pulse Pf. The output Q of the flip-flop F6 is shown as (E) in FIG. 2 and the output Q of the flip-flop F8 is shown as (G) in FIG. 2. Accordingly, as seen from FIG. 2, the flip-flop FS2 is reset when the output Q of the flip-flop F6 is the high level, the output Q of the flip-flop F8 is the high level, the output of the transistor Q84 is the high level due to the absence of the horizontal flyback pulse Pf, and the output of the transistor Q48 is the high level. Thus, the trailing end of the ineffective rendering pulse is defined. More specifically, the leading end of the ineffective rendering pulse is defined by the decoder 91 and the trailing end of the ineffective rendering pulse is defined by the decoder 92.

Meanwhile, specific operation of the above described ineffective rendering pulse generating circuit 9 was described in conjunction with the NTSC system. However, even in the PAL system, substantially the same applies, except that the flip-flop FS2 is set responsive to the transistor Q56, and therefore a detailed description will be omitted.

As described above, the ineffective rendering pulses Pm and $\overline{Pm}$ are obtained from the ineffective rendering pulse generating circuit 9. As seen from FIG. 2, the ineffective rendering pulse Pm is formed to cover the vertical synchronizing period and the equalizing pulse periods provided before and after the vertical synchronizing period. More specifically, since the ineffective rendering pulse Pm is generated as a function of the count values in the down counter 3 included in the vertical synchronizing circuit 1, the ineffective rendering pulse period can be maintained with extreme accuracy. The ineffective rendering pulse thus generated serves to render ineffective a composite synchronizing signal being applied to the video associated circuits, such as a horizontal automatic frequency control circuit or a horizontal automatic phase control circuit, or the synchronization detecting circuit while the picture associated circuits, such as a burst gate pulse generating circuit and a clamp pulse generating circuit for restoring the direct current component are rendered ineffective during the period of the ineffective rendering pulse.

Figure 3:
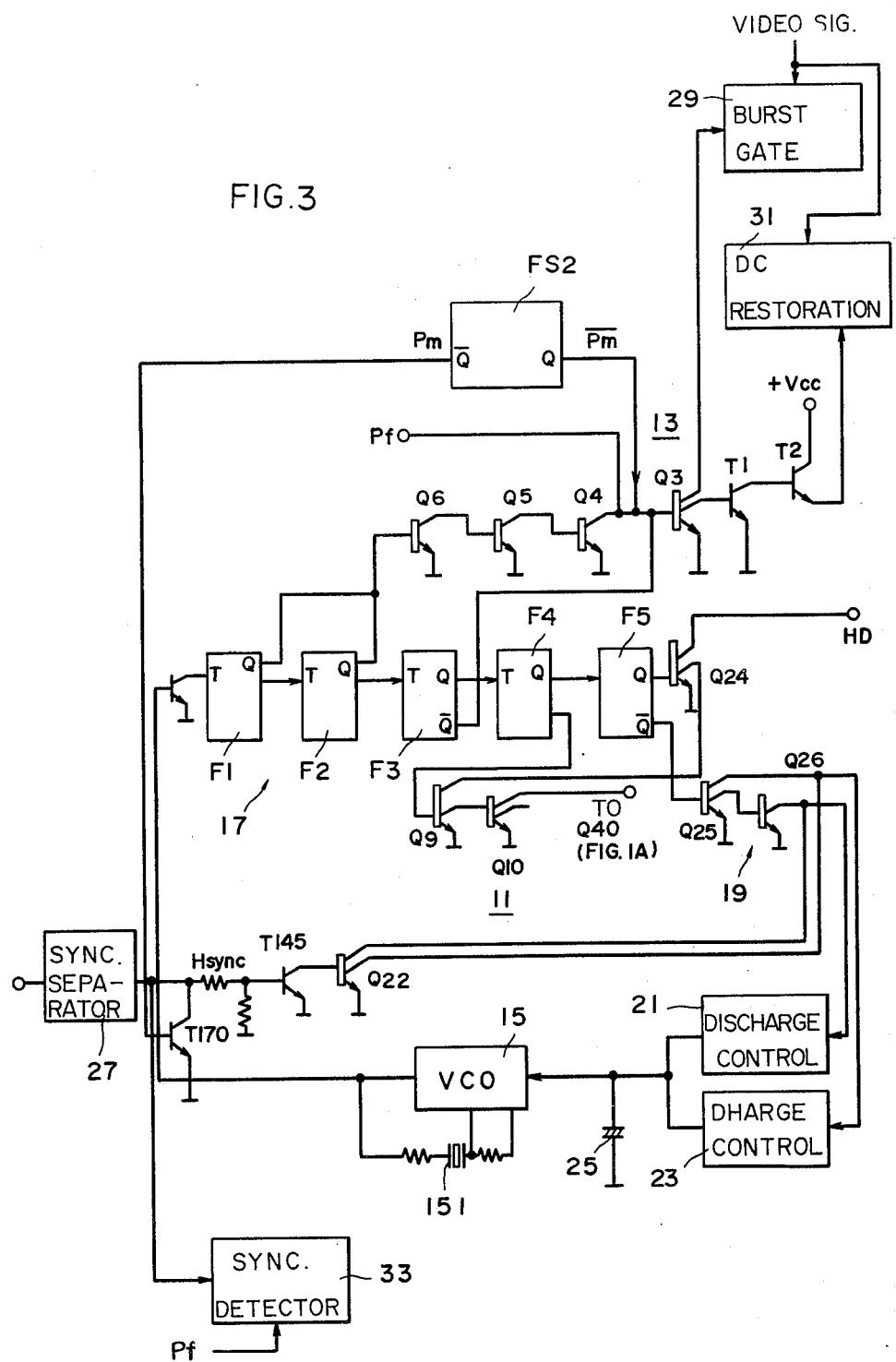
FIG. 3 is a block and schematic diagram showing a preferred embodiment of the present invention and particularly showing one example of a horizontal synchronizing circuit and a burst gate pulse generating circuit and those circuits associated therewith.

FIG. 3 is a block diagram showing a preferred embodiment of the present invention. FIG. 3 shows in detail the horizontal synchronizing circuit 11 and the burst gate pulse generating circuit 13.

The horizontal synchronizing circuit 11 may be an automatic frequency control system or an automatic phase control system; however, the FIG. 3 embodiment employs an automatic phase control system. The horizontal synchronizing circuit 11 comprises the voltage controlled oscillator 15, the count down circuit 17, the phase comparing circuit 19, the discharge control circuit 21, the charge control circuit 23 and the capacitor 25. The voltage controlled oscillator 15 includes a ceramic vibrator 151 and is basically as a variable frequency oscillator oscillation at the center frequency of 32 $f_H$, where $f_H$ is a horizontal oscillation frequency. The output of the voltage controlled oscillator 15 is applied to the count down circuit 17. The count down circuit 17 comprises five T-flip-flops F1 to F5 connected in a cascade fashion. The trigger input of the flip-flop F1 is supplied with the output of the voltage controlled oscillator 15. The count down circuit 17 frequency divides the output of the voltage controlled oscillator 15, i.e. 32 $f_H$ at the frequency division ratio of 1/32. Accordingly, the output of the flip-flop F5 provides the horizontal driving pulse HD of the duty factor of 50% and the frequency of $f_H$. The output $\overline{Q}$ of the flip-flop F5 is applied to the base of the transistor Q25 constituting the phase comparing circuit 19. The collector output of the transistor Q25 is applied to the base of the transistor Q26 and is also applied to the collector output of the transistor Q22. The collector output of the transistor Q26 is similarly connected to the collector output of the transistor Q22. The transistor Q22 is supplied with the output of the transistor T145 receiving the output from the synchronizing separator circuit 27. The synchronizing separator circuit 27 separates a composite synchronizing signal from a composite video signal, as is well-known. The composite synchronizing signal obtained from the synchronizing separator circuit 27 is applied to the respective collectors of the transistors Q25 and Q26 with the same polarity. Accordingly, the transistors Q25 and Q26 generate as a phase difference signal the ANDed output of the collector outputs and the horizontal synchronizing signal included in the composite synchronizing signal. The phase difference signal obtained from the collector of the transistor Q25 is applied to the charge control circuit 23 and the phase difference signal obtained at the collector of the transistor Q26 is applied to the discharge control circuit 21. The charge control circuit 23 and the discharge control circuit 21 are responsive to the given phase difference signals to control the charge amount and the discharge amount of the capacitor 25. Accordingly, the terminal voltage of the capacitor 25 becomes a direct current voltage associated with the phase difference between the oscillation output of the voltage controlled oscillator 15 and the horizontal synchronizing signal included in the composite synchronizing signal obtained from the synchronizing separator circuit 27. Such automatic phase control circuit is well-known and a detailed description thereof is omitted.

The FIG. 3 embodiment comprises a transistor T170 constituting an ineffective rendering means at the output of the synchronizing separator circuit 27. The transistor T170 receives at the base thereof the ineffective rendering pulse Pm from the flip-flop FS2 and the collector of the transistor T170 is connected to the output of the synchronizing separator circuit 27, i.e. the input of the transistor T145, and the emitter of the transistor T170 is connected to the ground. Accordingly, the phase comparator circuit 19 of the automatic phase control system included in the horizontal synchronizing circuit 11 is supplied with the composite synchronizing signal which is rendered ineffective with the ineffective rendering pulse Pm covering the vertical synchronizing period and the equalizing pulse periods. Accordingly, the horizontal automatic phase control circuit and/or the horizontal automatic frequency control circuit is not supplied with the vertical synchronizing signal nor the equalizing pulses and accordingly the distortion of the image at the start end of the horizontal scanning can be advantageously prevented.

Now the burst gate pulse generating circuit 13 will be described. The burst gate pulse generating circuit 13 generates a burst gate pulse by utilizing the horizontal flyback pulse Pf and the output of the flip-flop constituting the count down circuit 17 counting down the output of the voltage controlled oscillator 15. More specifically, the burst gate pulse generating circuit 13 comprises a cascade connection of the transistors Q6, Q5, Q4 and Q3. The base of the transistor Q6 is supplied with the output Q of the flip-flop F1 and the output Q of the flip-flop F2 simultaneously. The output of the transistor Q6 is applied through the transistors Q5 and Q4 to the input of the transistor Q3. The input of the transistor Q3 is supplied with the output $\overline{Q}$ of the flip-flop F3 and the horizontal flyback pulse Pf.

FIG. 4 is a timing chart for explaining the operation of the burst gate pulse generating circuit 13. The base of the transistor Q6 is supplied with the ANDed output of the output Q of the flip-flop F1 and the output Q of the flip-flop F2, as shown as (C) in FIG. 4. Accordingly, the output of the transistor Q4 and thus the input of the transistor Q3 is supplied with the signal as shown as (D) in FIG. 4. On the other hand, the output $\overline{Q}$ of the flip-flop F3 is shown as (E) in FIG. 4 and the horizontal flyback pulse Pf is shown as (F) in FIG. 4. Accordingly, the output of the transistor Q3 and thus the output of the burst gate pulse generating circuit 13 is shown as (I) in FIG. 4.

Meanwhile, as described previously, the voltage controlled oscillator 15 is selected such that the center frequency thereof may be 32 $f_H$ and the voltage controlled oscillator 15 is adapted to be in synchronization at the center of the horizontal synchronizing signal Hsync. Therefore, control is easily made such that the leading end of the burst gate pulse is positioned during the period of the horizontal synchronizing signal (G) in FIG. 4 and the trailing end thereof is positioned to be forward of the trailing end of the flyback pulse (F) in FIG. 4.

In the embodiment in discussion the base of the transistor Q3 is further supplied with the ineffective rendering pulse $\overline{Pm}$ from the flip-flop FS2. Accordingly, during the ineffective rendering pulse $\overline{Pm}$ the burst gate pulse (as shown as (I) in FIG. 4) necessarily becomes the high level. The burst gate pulse obtained from the burst gate pulse generating circuit 13 is supplied to the burst gate circuit 29. Furthermore, the output from the burst gate pulse generating circuit 13 is supplied through the transistors T1 and T2 connected in a cascade fashion to the direct current restoring circuit 31. Accordingly, no output is obtained from the burst gate circuit 29 during the period of the ineffective rendering pulse, i.e. during the equalizing pulse period and the vertical synchronizing period, and therefore the signal to noise ratio of the reproduced color signal is prevented from being degraded. Likewise, a direct current restoration circuit 31 is also rendered ineffective during the period of the ineffective rendering pulse and therefore the output of the circuit 31 is prevented from being fixed to the peak level of the vertical synchronizing signal. Accordingly, at the beginning of the succeeding video signal period after the termination of the vertical synchronization period and the equalizing pulse periods a brightness variation at the upper portion of the television screen can be advantageously prevented.

In the FIG. 3 embodiment the output of the synchronizing separator circuit 27 is applied to the synchronization detecting circuit 33. The synchronization detecting circuit 33 compares the phases of the horizontal synchronizing signal included in the composite synchronizing signal and the horizontal flyback pulse, thereby to detect whether or not the color television receiver is in the synchronized state. The composite synchronizing signal being applied to the synchronization detecting circuit 33 is also being rendered ineffective with an ineffective rendering pulse for covering the vertical synchronizing period and the equalizing pulse period by means of the above described ineffective rendering means, i.e. the transistor T170. Therefore, a detection sensitivity in the synchronization detecting circuit 33 can be advantageously prevented from being decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture stabilizing circuit in a color television receiver, comprising:
   a vertical synchronizing circuit of a pulse count system including counter means for making a count operation responsive to one of a horizontal synchronizing signal and a signal associated with the horizontal synchronizing signal in terms of the phase and the frequency,
   reset means responsive to any of a vertical synchronizing signal and a predetermined output of said counter means for resetting said counter means,
   ineffective rendering pulse generating means responsive to a count value in said counter means for generating an ineffective rendering pulse covering at least a vertical synchronization pulse period,
   at least one picture associated circuit receiving one of a composite synchronizing signal and a horizontal period signal in synchronism with the composite synchronizing signal, and
   ineffective rendering means responsive to said ineffective rendering pulse for rendering ineffective said at least one picture associated circuit during the period of said ineffective rendering pulse.

2. A picture stabilizing circuit in a color television receiver in accordance with claim 1, wherein
   said ineffective rendering pulse generating means comprises
   two-state means for providing said ineffective rendering pulse as an output thereof,
   a first decoder responsive to a first predetermined output of said counter means for setting said two-state means, and
   a second decoder responsive to a second predetermined output of said counter means for resetting said two-state means.

3. A picture stabilizing circuit in a color television receiver in accordance with claim 2, wherein
   said first predetermined output of said counter means associated with said first decoder may selectively be either one of two kinds of signal, and
   said first decoder is adapted to utilize one of said two kinds on the occasion of reception of a color television signal of an NTSC system and to utilize the other of said two kinds on the occasion of reception of a color television signal of a PAL system.

4. A picture stabilizing circuit in a color television receiver in accordance with claim 2, wherein
   said color television signal comprises equalizing pulse periods before and after of said vertical synchronization period,
   said first decoder comprises means for setting said two-state means in the vicinity of the beginning of said equalizing pulse period before said vertical synchronization period, and
   said second decoder comprises means for resetting said two-state means in the vicinity of the end of said equalizing pulse period after said vertical synchronization period.

5. A picture stabilizing circuit in a color television receiver in accordance with claim 4, wherein
   the input signal to said counter means is a repetitive signal having a repetition period equal to the repetition period of the horizontal synchronizing signal,
   said counter means comprises first to ninth flip-flops connected in a cascade fashion and receiving said signal associated with the horizontal synchronizing signal at the input of said first flip-flop,
   said first decoder comprises a circuit for processing in a logical product manner the output of said second flip-flop, the output of said third flip-flop, the output of said ninth flip-flop and a horizontal flyback signal, and said two-state means is set responsive to the output of said circuit.

6. A picture stabilizing circuit in a color television receiver in accordance with claim 4, wherein
   the repetition period of the signal applied to said counter means is selected to be equal to the repetition period of the horizontal synchronizing signal, said counter means comprises first to ninth flip-flops connected in a cascade fashion and receiving said signal associated with the horizontal synchronizing signal at the input of said first flip-flop, said first decoder comprises a circuit for processing in a logical product manner the output of said first flip-flop, the output of said third flip-flop, the output of said sixth flip-flop, the output of said ninth flip-flop, and a horizontal flyback signal, and said two-state means is set responsive to the output of said circuit.

7. A picture stabilizing circuit in a color television receiver in accordance with claims 5 or 6, wherein the repetition period of the signal applied to said counter means is selected to be equal to the repetition period of the horizontal synchronizing signal.

said second decoder comprises a circuit for processing in a logical product manner the output of said first flip-flop, the output of said third flip-flop, and the signal from said reset means, and said two-state means is reset responsive to the output of said circuit.

8. A picture stabilizing circuit in a color television receiver in accordance with claim 1, which further comprises at least one of a horizontal automatic frequency control circuit and a horizontal automatic phase control circuit receiving said composite synchronizing signal as a reference signal, and wherein said ineffective rendering means comprises means responsive to said ineffective rendering pulse for rendering ineffective said composite synchronizing signal being applied to at least one of said horizontal automatic frequency control circuit and said horizontal automatic phase control circuit during only the period of said ineffective rendering pulse.

9. A picture stabilizing circuit in accordance with claim 1, which further comprises a burst gate pulse generating circuit responsive to a signal associated with said horizontal synchronizing signal in terms of the phase and the frequency and a horizontal flyback pulse for generating a burst gate pulse, and wherein said ineffective rendering means comprises means responsive to said ineffective rendering pulse for rendering ineffective a burst gate pulse being obtained from said burst gate pulse generating circuit during only the period of said ineffective rendering pulse.

10. A picture stabilizing circuit in accordance with claim 1, which further comprises a clamp pulse generating circuit responsive to a signal associated with said horizontal synchronizing signal in terms of the phase and the frequency and a horizontal flyback pulse for generating a clamp pulse for restoring a direct current component of a video signal, and wherein said ineffective rendering means comprises means responsive to said ineffective rendering pulse for rendering ineffective said clamp pulse being obtained from said clamp pulse generating circuit during only the period of said ineffective rendering pulse.

11. A picture stabilizing circuit in a color television receiver in accordance with claim 1, which further comprises a synchronization detecting circuit for detecting whether or not the color television receiver is in a synchronized state upon comparison of phases of the horizontal synchronizing signal included in said composite synchronizing signal and a horizontal flyback signal, and wherein said ineffective rendering means comprises means responsive to said ineffective rendering pulse for rendering ineffective said composite synchronizing signal being applied to said synchronization detecting circuit during only the period of said ineffective rendering pulse.

* * * * *